(12) United States Patent
Kembel et al.

(10) Patent No.: US 9,400,846 B2
(45) Date of Patent: Jul. 26, 2016

(54) METHOD AND SYSTEM FOR MANAGING INFORMATION IN AN ON-LINE COMMUNITY

(75) Inventors: John Albert Kembel, Louisville, CO (US); Geoff Kembel, Boulder, CO (US); Carlos Rodriguez, Boulder, CO (US); Jeremy Kembel, Boulder, CO (US)

(73) Assignee: ORACLE OTC SUBSIDIARY LLC, Redwood Shores, CA (US)

( * ) Notice: Subject to any disclaimer, the term of this patent is extended or adjusted under 35 U.S.C. 154(b) by 1218 days.

(21) Appl. No.: 11/559,743

(22) Filed: Nov. 14, 2006

(65) Prior Publication Data

US 2007/0130164 A1 Jun. 7, 2007

Related U.S. Application Data

(60) Provisional application No. 60/736,607, filed on Nov. 14, 2005.

(51) Int. Cl.
*G06F 17/30* (2006.01)
*H04L 9/32* (2006.01)
*H04W 4/08* (2009.01)

(52) U.S. Cl.
CPC .................................. *G06F 17/3089* (2013.01)

(58) Field of Classification Search
CPC ............... H04L 67/306; H04L 63/102; H04M 1/72519; H04M 1/72566
USPC ............................................. 709/203; 705/9
See application file for complete search history.

(56) References Cited

U.S. PATENT DOCUMENTS

| | | | |
|---|---|---|---|
| 3,701,348 A * | 10/1972 | Navara | 600/214 |
| 6,269,369 B1 * | 7/2001 | Robertson | G06Q 10/02 |
| 6,324,587 B1 * | 11/2001 | Trenbeath et al. | 719/310 |
| 6,393,421 B1 * | 5/2002 | Paglin | 707/9 |
| 6,694,353 B2 * | 2/2004 | Sommerer | 709/206 |
| 6,701,348 B2 * | 3/2004 | Sommerer | 709/206 |
| 6,714,916 B1 * | 3/2004 | Robertson et al. | 705/9 |
| 7,080,104 B2 * | 7/2006 | Ring et al. | 707/203 |
| 7,194,419 B2 * | 3/2007 | Robertson et al. | 705/8 |
| 2003/0028595 A1 * | 2/2003 | Vogt | G06Q 10/10 709/204 |
| 2004/0122693 A1 * | 6/2004 | Hatscher | G06Q 10/06313 705/319 |
| 2005/0120084 A1 * | 6/2005 | Hu | G06Q 10/107 709/206 |
| 2005/0228824 A1 * | 10/2005 | Gattuso et al. | 707/104.1 |

OTHER PUBLICATIONS http://www.facebook.com; website; Nov. 1, 2006; 21 pages.
http://www.vox.com; website; 4 pages.
http://www.myspace.com; website; Apr. 23, 2007; 2 pages.
http://www.coghead.com; website; Apr. 23, 2007; 3 pages.
http://www.ning.com; website; Apr. 23, 2007; 2 pages.

* cited by examiner

*Primary Examiner* — Asad Nawaz
*Assistant Examiner* — Jason Harley
(74) *Attorney, Agent, or Firm* — Kilpatrick Townsend & Stockton LLP

(57) ABSTRACT

A method and system for managing information in an on-line community is described. One embodiment assigns, in an information management system, a distinct domain to each member of the on-line community, each member of the on-line community being associated with a client computer that is connected with the information management system over a network, each distinct domain being capable of hosting at least one on-line information archive associated with the member assigned to that distinct domain; associates with each on-line information archive at least one member-configurable data entry form, each member-configurable data entry form associated with a given on-line information archive defining a format of a specific type of information item that may be posted to that on-line information archive, each member-configurable data entry form associated with the given on-line information archive including a name and at least one form field, the name being specifiable by the member of the on-line community associated with the given on-line information archive, the at least one form field being definable and configurable by the member of the on-line community associated with the given on-line information archive; and sets access permissions for each on-line information archive in accordance with preferences of the member associated with that on-line information archive, the access permissions specifying which members of the on-line community are permitted to access that on-line information archive and to what extent each of those members is permitted to access that on-line information archive.

24 Claims, 15 Drawing Sheets

|  | VIEW | | |
|---|---|---|---|
| POST | 1 | SELECT GROUP | UNLIMITED |
| 1 | PRIVATE 405 | SHARED 420 | PUBLIC 435 |
| SELECT GROUP | RESTRICTED DROP BOX 410 | RESTRICTED GROUP 425 | PUBLISHED GROUP 440 |
| UNLIMITED | DROP BOX 415 | GROUP DROP BOX 430 | PUBLIC GROUP 445 |

METHOD AND SYSTEM FOR MANAGING INFORMATION IN AN ON-LINE COMMUNITY

PRIORITY

The present application claims priority from commonly owned and assigned application Ser. No. 60/736,607 Nov. 14, 2005, entitled SYSTEM AND METHOD FOR CENTRALIZED, FLEXIBLE, SOCIAL INFORMATION MANAGEMENT, which is incorporated herein by reference in its entirety.

FIELD OF THE INVENTION

The present invention relates to computerized information management systems. In particular, but not by way of limitation, the present invention relates to methods and systems for managing information in an on-line community made up of a plurality of members.

BACKGROUND OF THE INVENTION

Keeping track of and finding needed information can be challenging. For example, an individual may have important information stored on a personal computer, in a personal digital assistant (PDA), in a cellular phone, in various paper records and notes, and in other locations. If accessing this scattered personal information is difficult for that individual, accessing needed information that the individual knows is in the possession of others such as friends and loved ones is even more difficult. Often, the individual ends up leaving a voice-mail message or sending an e-mail to request the desired information, resulting in delay.

To address this desire people have for information from and about their friends and loved ones, a variety of World-Wide-Web-based services have emerged that allow a computer user, after becoming a member, to post a variety of information that can be shared with the world or with a select group of other members. Each member is provided with space on a Web server to store his or her information. For example, some of these on-line services allow members to post photos, video clips, a blog (a diary-like, reverse-chronologically-ordered document on a particular topic), contact information, a résumé, or other information. These services also allow each member to decide whom to include in the member's social network. That is, each member can designate certain other members of the service as "friends" with whom information may be exchanged.

Though a step in the right direction, these on-line social-network services constrain their members to post information of a small number of specific kinds and in fixed formats that are determined by the service provider. Members do not have the flexibility to create new categories of information items or "posts," and they do not have the flexibility to alter the design and format of the fixed Web forms used to post information items. Moreover, these services do not provide members with sufficient flexibility in controlling which other members can access their information.

It is thus apparent that there is a need in the art for an improved method and system for managing information in an on-line community.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

The present invention can provide a method and system for managing information in an on-line community. One illustrative embodiment is a method for managing information in an on-line community, comprising assigning, in an information management system, a distinct domain to each member of the on-line community, each member of the on-line community being associated with a client computer that is connected with the information management system over a network, each distinct domain being capable of hosting at least one on-line information archive associated with the member assigned to that distinct domain; associating with each on-line information archive at least one member-configurable data entry form, each member-configurable data entry form associated with a given on-line information archive defining a format of a specific type of information item that may be posted to that on-line information archive, each member-configurable data entry form associated with the given on-line information archive including a name and at least one form field, the name being specifiable by the member of the on-line community associated with the given on-line information archive, the at least one form field being definable and configurable by the member of the on-line community associated with the given on-line information archive; and setting access permissions for each on-line information archive in accordance with preferences of the member associated with that on-line information archive, the access permissions specifying which members of the on-line community are permitted to access that on-line information archive and to what extent each of those members is permitted to access that on-line information archive.

Another illustrative embodiment is a system for managing information in an on-line community, comprising a domain-administration module configured to manage a plurality of domains, each domain corresponding to a member of the on-line community, each member of the on-line community being associated with a client computer that is connected with the information management system over a network, each domain being capable of hosting at least one on-line information archive associated with the member of the on-line community to which that domain corresponds; a data-format-management module configured to associate with each on-line information archive at least one member-configurable data entry form, each member-configurable data entry form associated with a given on-line information archive defining a format of a specific type of information item that may be posted to that on-line information archive, each member-configurable data entry form associated with the given on-line information archive including a name and at least one form field, the name being specifiable by the member of the on-line community associated with the given on-line information archive, the at least one form field being definable and configurable by the member of the on-line community associated with the given on-line information archive; and a data-access-control module configured to assign access permissions to each on-line information archive in accordance with preferences of the member associated with that on-line information archive, the access permissions specifying which members of the on-line community are permitted to access that on-line information archive and to what extent each of those members is permitted to access that on-line information archive.

Yet another embodiment is a system for managing information in an on-line community, comprising a server partitioned into a plurality of domains, each domain in the plurality of domains corresponding to a member of the on-line community, each member of the on-line community being associated with a client computer that is connected with the server over the World Wide Web, each domain being capable of hosting at least one on-line information archive associated with the member of the on-line community to which that domain corresponds; and a fully hosted Web application running on the server, the fully hosted Web application being configured to interface the server with a Web browser application on each of the client computers associated with the respective members of the on-line community; designate, for each member of the on-line community, at least one other member of the on-line community as belonging to that member's social network; associate with each on-line information archive at least one dynamic Web form, each dynamic Web form associated with a given on-line information archive defining a format of a specific type of information item that may be posted to that on-line information archive, each dynamic Web form associated with the given on-line information archive being modifiable by the member of the on-line community associated with the given on-line information archive; and set access permissions for each on-line information archive in accordance with preferences of the member associated with that on-line information archive, the access permissions specifying which members of the on-line community are permitted to access that on-line information archive and to what extent each of those members is permitted to access that on-line information archive.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

FIG. 4 is a chart showing various access permissions that can be assigned to an on-line information archive in accordance with an illustrative embodiment of the invention;

DETAILED DESCRIPTION

Figure 1:
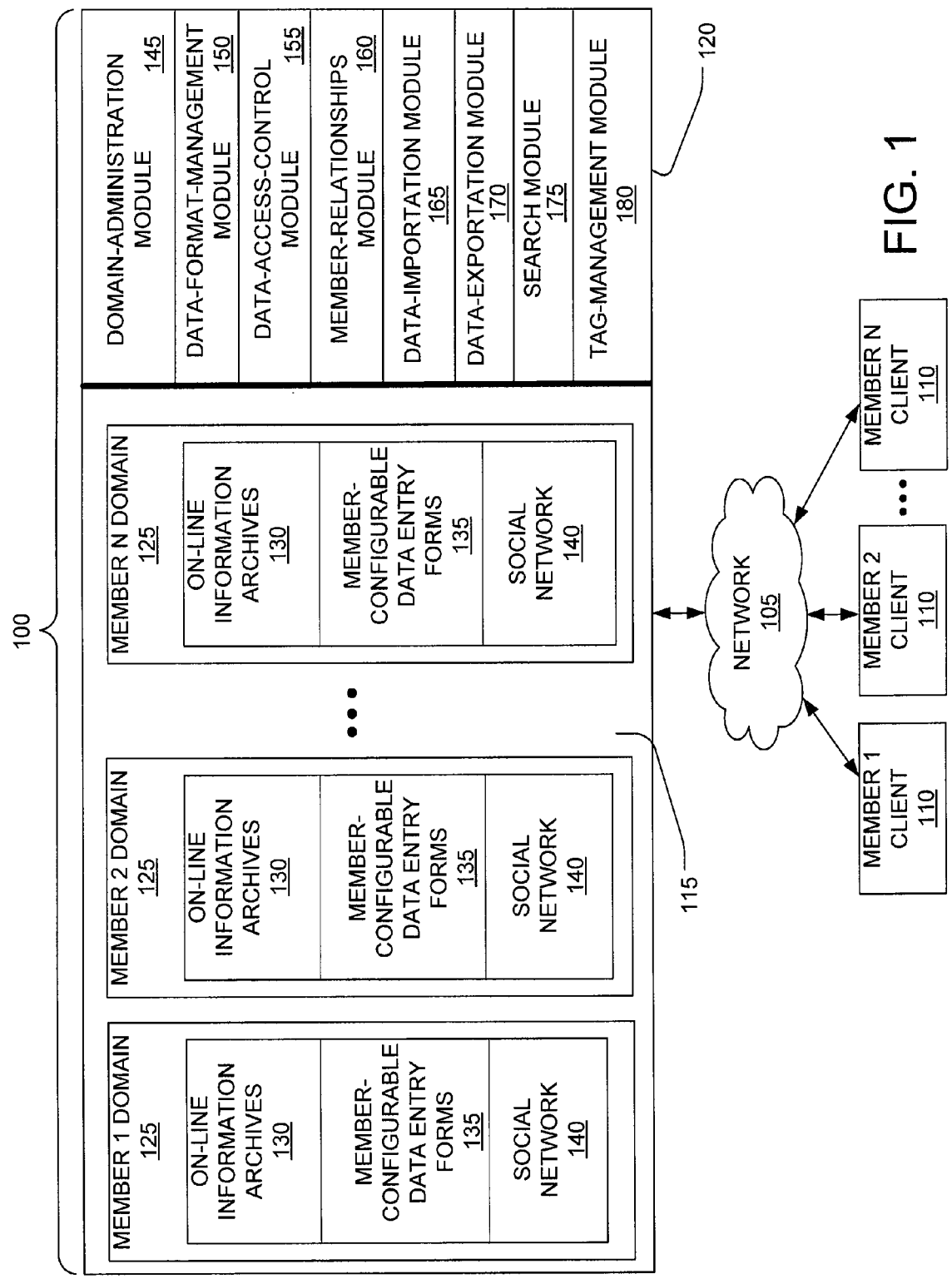
FIG. 1 is a functional block diagram of an environment including an information management system for managing information in an on-line community in accordance with an illustrative embodiment of the invention.

In an illustrative embodiment of the invention, each member of an on-line community ("member") is provided, in an information management system, with a domain in which to store his or her information. Each domain is capable of hosting one or more on-line information archives ("archives") that act as repositories of information associated with the member in whose domain they reside. Members access the archives from a client computer over a network such as the Internet or a private local area network (LAN). Members assign access permissions to their archives, the access permissions determining which other members, if any, can post (write) to or view a particular archive. Archives can be private, shared with a specific group of other members, or public. A public archive is accessible, at least to some extent, to all members and, in some embodiments, to any computer user with access to the network. Members may create new archives and delete existing archives. Members may also designate specific other members as being part of their social network in the on-line community.

Each archive stores a collection of information items of one or more types. Information items posted to an archive are also sometimes referred to herein as "posts." To add new data to an archive, whether his or her own or that of another member, a member posts a new information item to that archive. A member viewing an archive can begin with a concise list of the information items posted to that archive or perhaps the most recent information items posted.

In this illustrative embodiment, the information management system associates one or more member-configurable data entry forms with each archive. Each member-configurable data entry form associated with a given archive defines the content and format of a specific type of information item that may be posted to that archive. That is, the member-configurable data entry form acts as a reusable template for posting a particular type of information item to the archive. Each posted information item may be thought of as an instance of the member-configurable data entry form.

Members may create new member-configurable data entry forms for their archives, assign the member-configurable data entry forms distinct names, and define and configure the fields of the member-configurable data entry forms. For example, a member can create a member-configurable data entry form called "book review" and define the fields (title, author, publisher, review text, etc.) to be included in the reusable template. The member decides how many fields to include in the template. The information management system can also optionally provide default member-configurable data entry forms for common types of information items such as contacts, notes, blogs, and other types of information items. Members are able to then tailor these default member-configurable data entry forms to suit their own needs.

A member can also configure each individual field of a member-configurable data entry form to be of a specific type such as text, an image, an audio file, a video file, or other information object. In one embodiment, the member configures the type of a field by selecting the desired field type from a dropdown list.

The embodiment described above provides members with significant flexibility in creating customized archives, the ability to control which other members have access to those archives, and to what extent those other members have access. In short, this embodiment allows members to share what they know with the people they know and to benefit from what others know and are willing to share.

In another embodiment, a single domain of the information management system can optionally be assigned jointly to a plurality of members, creating a "group" entity in the on-line community with shared archives and shared control of the access permissions associated with those shared archives.

Referring now to the drawings, where like or similar elements are designated with identical reference numerals throughout the several views, and referring in particular to FIG. 1, it is a functional block diagram of an environment including an information management system 100 for managing information in an on-line community in accordance with an illustrative embodiment of the invention. Information management system 100 communicates over network 105 with one or more client computers 110 associated with the respective members. In some embodiments, information management system 100 is centralized in a single server. In other embodiments, the functionality of information management system may be distributed among multiple servers or other computer systems.

Information management system 100 includes a data section 115 and a code section 120. Data section 115 includes a domain 125 for each member. Associated with the domain 125 of each member are one or more archives 130, one or more member-configurable data entry forms 135, and a social network 140. Social network 140 is one or more other members whom a member has designated as those with whom that member desires to interact on-line within the on-line community.

For convenience in this Detailed Description, code section 120 has been divided into a set of functional modules: domain-administration module 145, data-format-management module 150, data-access-control module 155, member-relationships module 160, data-importation module 165, data exportation module 170, search module 175, and tag-management module 180. Domain-administration module 145 handles the assignment of domains 125 to members and otherwise manages the domains 125 associated with the members. In some embodiments, domain-administration module 145 also handles member logins and authentication. The remaining functional modules will be described in later portions of this Detailed Description.

The functionality of these modules in code section 120 may be subdivided or combined differently in other embodiments. In one embodiment, the functionality of these modules is implemented as software or firmware executed by a processor on a computer system such as a server (not shown in FIG. 1). In general, the functionality of the modules of code section 120 may be implemented in software, firmware, hardware, or any combination thereof.

Figure 2:
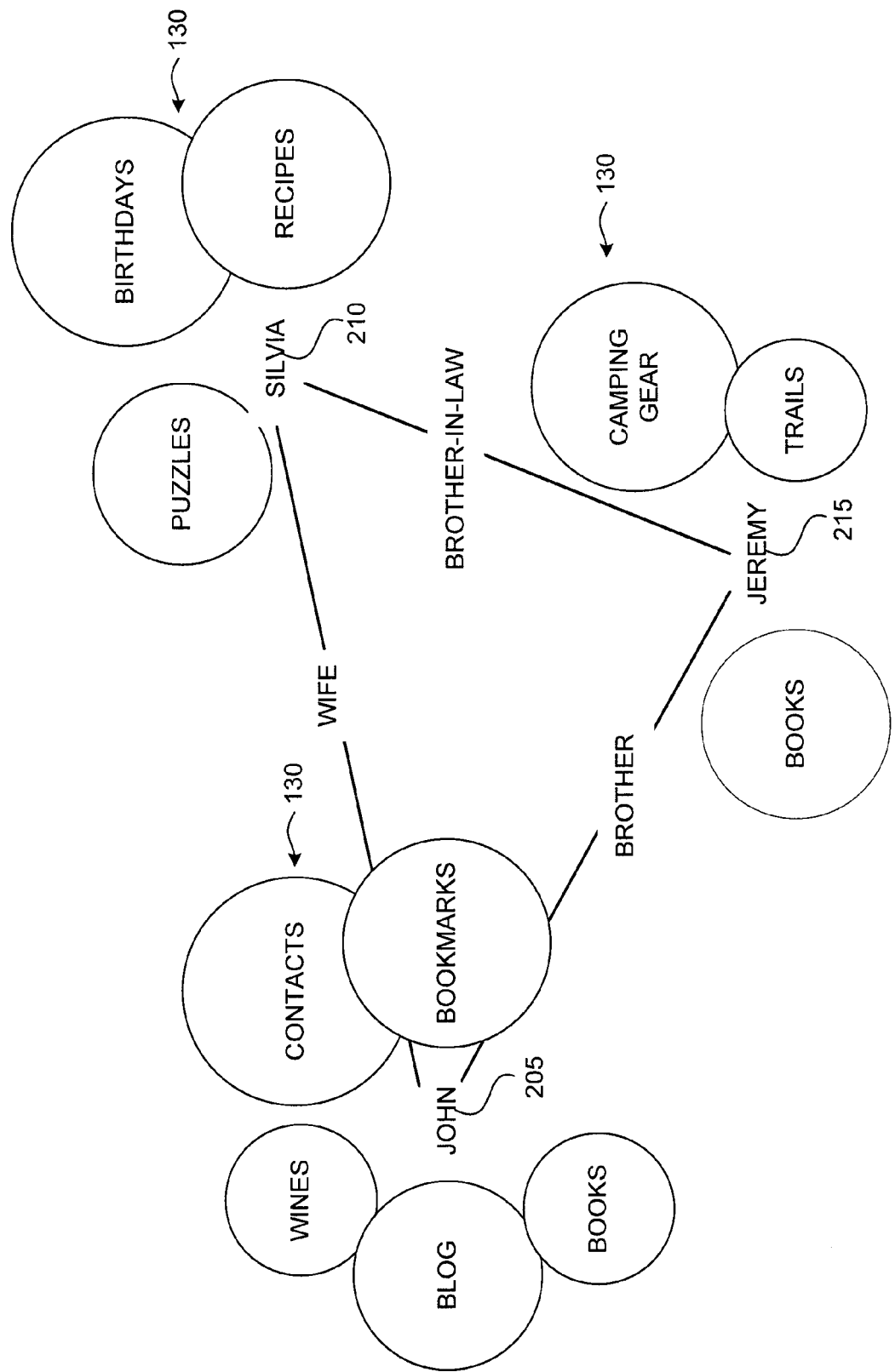
FIG. 2 is a diagram illustrating an application of an information management system in accordance with an illustrative embodiment of the invention.

FIG. 2 is a diagram illustrating an application of an information management system 100 in accordance with an illustrative embodiment of the invention. In FIG. 2, three members of an on-line community, John (205), his wife Silvia (210), and his brother Jeremy (215) each have a set of associated archives 130. These members have given one another access, at least to some extent, to their respective archives 130, and they are in one another's social network 140. In this example, Silvia is very conscientious about keeping track of family birthdays. If John or Jeremy wishes to look up the birthday of an uncle or cousin, he can consult Silvia's "BIRTHDAYS" archive 130. If John wants to know what Jeremy thinks of a particular piece of camping gear, he can visit Jeremy's "CAMPING GEAR" archive 130. If Jeremy wants to see what books John has been reading lately and how much he enjoyed them, he can visit John's "BOOKS" archive 130. These are but a few simple examples of the many ways in which embodiments of the invention can be applied.

In creating their archives 130, the members shown in FIG. 2 can create or adapt custom member-configurable data entry forms 135 for each type of information item to be posted to a given archive 130. For example, Silvia has created a "PUZZLES" archive 130 with an associated member-configurable data entry form for each type of puzzle she likes, each member-configurable data entry form 135 having a name and fields tailored to her individual tastes and needs.

Figure 3:
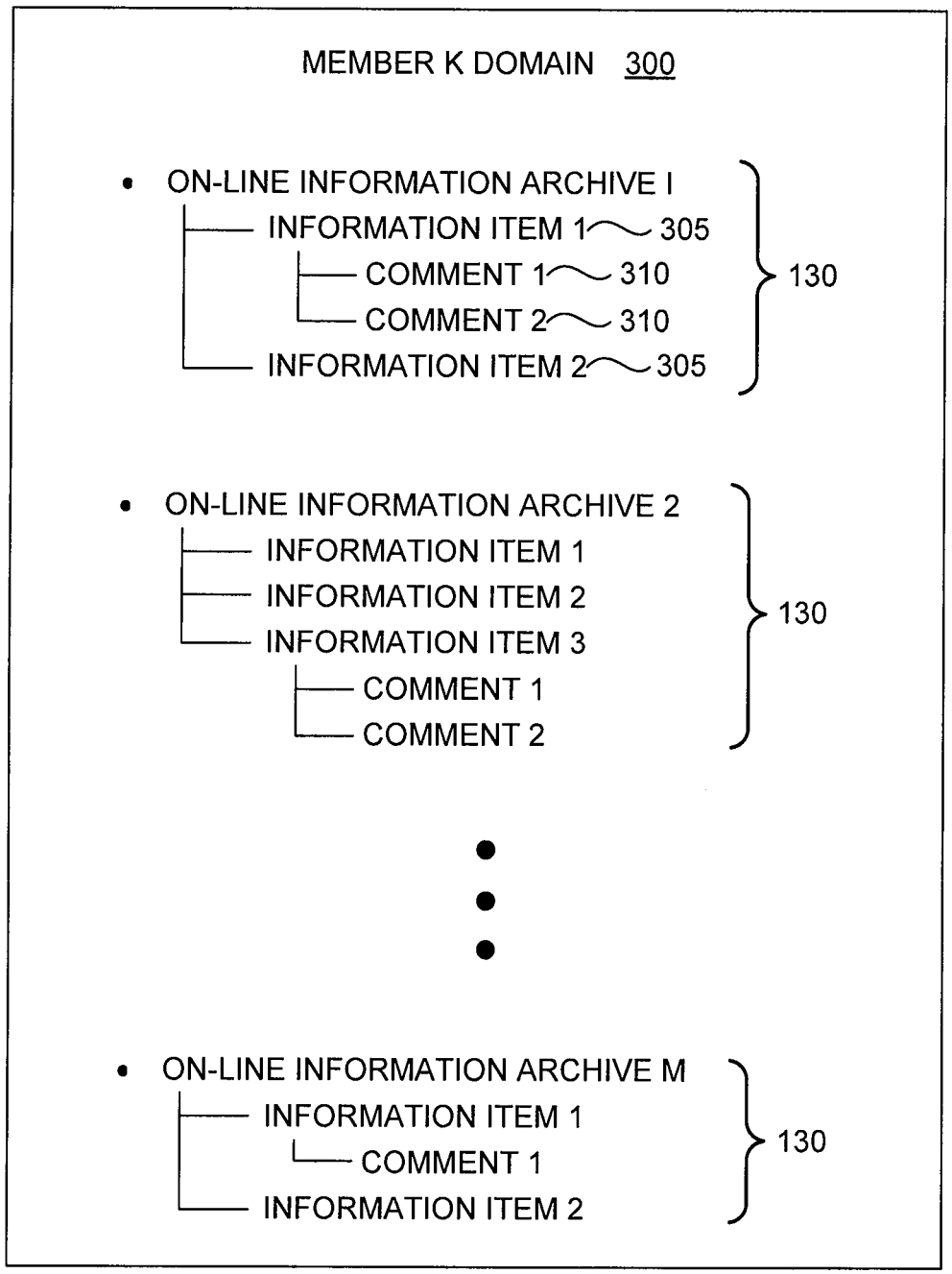
FIG. 3 is a diagram showing the organization of information in on-line information archives associated with a domain belonging to a member of an on-line community in accordance with an illustrative embodiment of the invention.

FIG. 3 is a diagram showing the organization of information in archives 130 associated with a domain 300 belonging to a member of an on-line community in accordance with an illustrative embodiment of the invention. The large box in FIG. 3 represents a domain 300 associated with an arbitrary Kth member, K being an integer between 1 and N (see FIG. 1). Domain 300 includes M archives 130. Each archive 130 may store one or more information items or posts 305. In some embodiments, members with permission may post comments 310 to specific information items 305. For example, one member may post a photograph of a recent vacation in a "vacation photos" archive 130, and another member who has permission to view and comment on information items 305 in that archive 130 may post a comment 310 about the photograph. To promote clarity in FIG. 3, not all information items 305 and comments 310 have been labeled with reference numerals.

Examples of information items include, without limitation, notes, blogs, collaborative Web documents, contacts, recipes, product reviews, images, audio files, video files, drop boxes, e-mail messages, Webzines, and newsletters.

FIG. 4 is a chart 400 showing various access permissions that can be assigned to an archive 130 in accordance with an illustrative embodiment of the invention. These access permissions are managed by data-access-control module 155. Via a user interface, data-access-control module receives a member's preferences concerning access permissions for a particular archive 130 and applies those preferences to that archive 130. FIG. 4 is merely one example of how access permissions can be defined and applied. In some embodiments, data-access-control module 155 enforces access permissions that are more granularly tailored to particular applications. For example, in one embodiment, data-access-control module 155 supports a situation in which N members can post to archives 130 belonging to M other members, any of whom may have individually variable posting, editing, or commenting privileges.

For the purposes of FIG. 4, the member in whose domain 125 an archive 130 resides will be termed an "owner." The owner of an archive 130 determines the access permissions associated with a particular archive 130 in the owner's domain 125. In one embodiment in which a single domain 125 is shared by a group of members, the members of the group jointly "own" the archive 130 and have equal say in the access permissions for archives 130 hosted in the shared domain 125. In other embodiments, the members of the group do not necessarily have the same access privileges. For example, one or more members of the group may have administrative privileges that exceed those of the other members of the group with respect to archives 130 that are associated with the shared domain.

An archive 130 to which only its owner may post and that only its owner may view may be termed a private archive 405. An archive 130 to which its owner and a select group of other members may post and that only its owner may view may be termed a restricted drop box 410. An archive 130 to which any member may post but that only its owner may view may be termed a drop box 415. An archive 130 to which only its owner may post and that only its owner and a select group of other members may view may be termed a shared archive 420. An archive 130 to which its owner and a select group of other members may post and that only those same members may view may be termed a restricted-group archive 425.

An archive 130 to which any member may post but that only its owner and a select group of other members may view may be termed a group drop box 430. An archive 130 to which only its owner may post and that any member may view may be termed a public archive 435. An archive 130 to which only its owner and a select group of members may post and that only those same members may view may be termed a published group 440. An archive 130 to which any member and post and that any member may view may be termed a public group archive 445.

Another dimension to access permissions is whether a given member is permitted to modify or edit existing information items 305 in archives 130. In some embodiments, data-access-control module 155 is configured to manage these permissions in addition to permissions concerning posting and viewing. In an embodiment in which a single domain 125 is shared by a group of members, each member in the group can, in some applications, be permitted to modify or edit existing information items 305 in archives 130 hosted by the shared domain 125. This facilitates the creation and management of restricted collaborative documents.

Note that, depending on how a member configures an archive 130 using member-configurable data entry forms 135 and how the member sets the access permissions of the archive 130, the archive 130 can emulate a wide variety of on-line information repositories, including, without limitation, blogs and "wikis." Blogs have become ubiquitous on the World Wide Web, and one well-known example of a wiki is the popular Wikipedia Web site, a collaborative on-line encyclopedia the articles of which any Internet user may edit. Thus a restricted group archive 425 may be used to store restricted collaborative documents if all members of the group are also given permission to edit existing posts. A public group archive 445 may be established to emulate a wiki if all members are granted permission to edit existing posts. As a further example, a member may set up a public archive 435 as a blog with a custom member-configurable data entry form 135 tailored to his or her specific needs.

Membership in the on-line community need not include identical privileges for every member. In some embodiments, information management system 100 recognizes different types or classes of membership, each having its own differing access and administration privileges. For example, in a private (closed) on-line community belonging to an enterprise, certain individuals in the enterprise can be given special administrative membership privileges that allow them to administer the information management system 100 for the other members. In some embodiments, the respective domains associated with members of a particular type are not configured to host archives 130. That is, in some embodiments, not all members of the on-line community are permitted to own archives 130.

Figure 5:
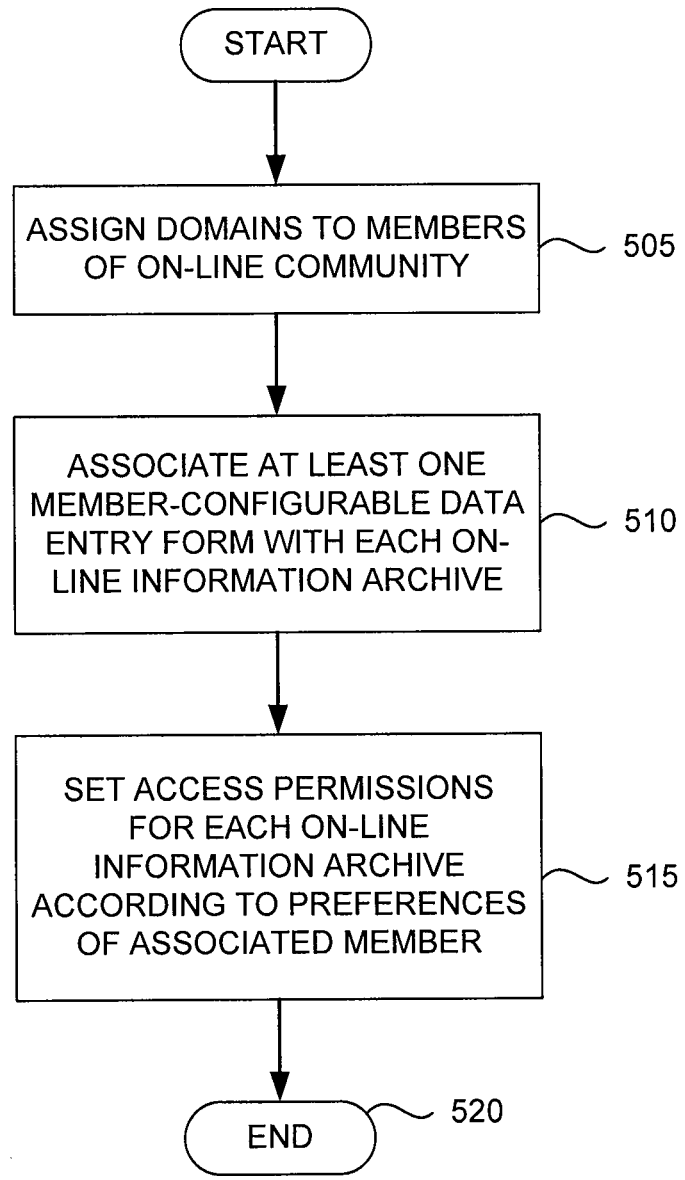
FIG. 5 is a flowchart of a method for managing information in an on-line community in accordance with an illustrative embodiment of the invention.

FIG. 5 is a flowchart of a method for managing information in an on-line community in accordance with an illustrative embodiment of the invention. At 505, domain-administration module 145 assigns a domain to each member. In some embodiments, a unique domain is assigned to each different member; in other embodiments, a single member may have more than one domain assigned to him or her under different e-mail addresses or user names. At 510, data-format-management module 150 associates at least one member-configurable data entry form 135 with each archive 130. At 515, data-access-control module 155 sets access permissions for each archive 130 in accordance with the preferences of the member associated with that archive 130. Various examples of access permissions are summarized above in connection with FIG. 4. At 520, the process terminates.

Figure 6:
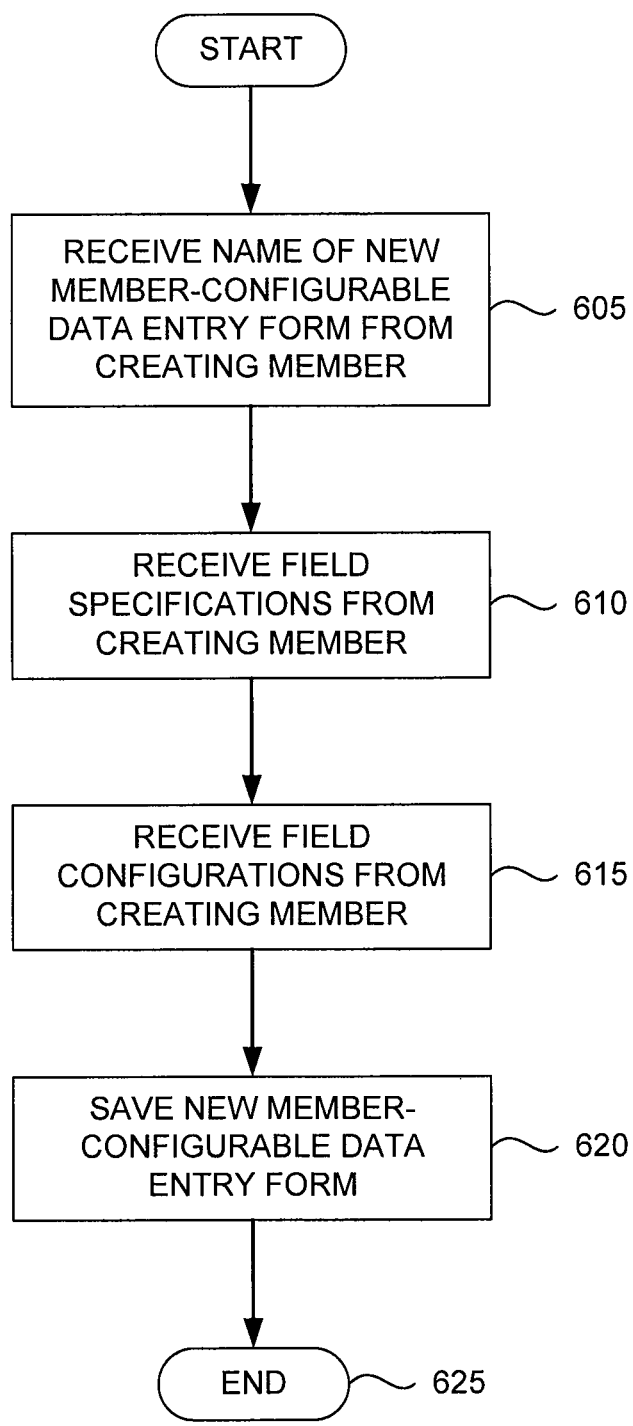
FIG. 6 is a flowchart of a method for creating and configuring a member-configurable data entry form for posting information items of a particular type to an on-line information archive in accordance with an illustrative embodiment of the invention.

FIG. 6 is a flowchart of a method for creating and configuring a member-configurable data entry form 135 for posting information items 305 of a particular type to an archive 130 in accordance with an illustrative embodiment of the invention. At 605, data-format-management module 150 receives, from a member, the name of a new member-configurable data entry form 135. At 610, data-format-management module 150 receives, via a suitable user interface, field specifications such as the number of fields and their respective names for the new member-configurable data entry form 135. At 615, data-format-management module 150 receives configuration information such as field type and optional field descriptions for each field in the new member-configurable data entry form 135. At 620, data-format-management module 150 saves the new member-configurable data entry form 135. The process terminates at 625.

The steps indicated in FIG. 6 may also be applied to the modification of the name and fields of an already-existing member-configurable data entry form 135. In one embodiment, the member-configurable data entry forms 135 of information management system 100 are implemented as dynamic Web forms.

Figure 7A:
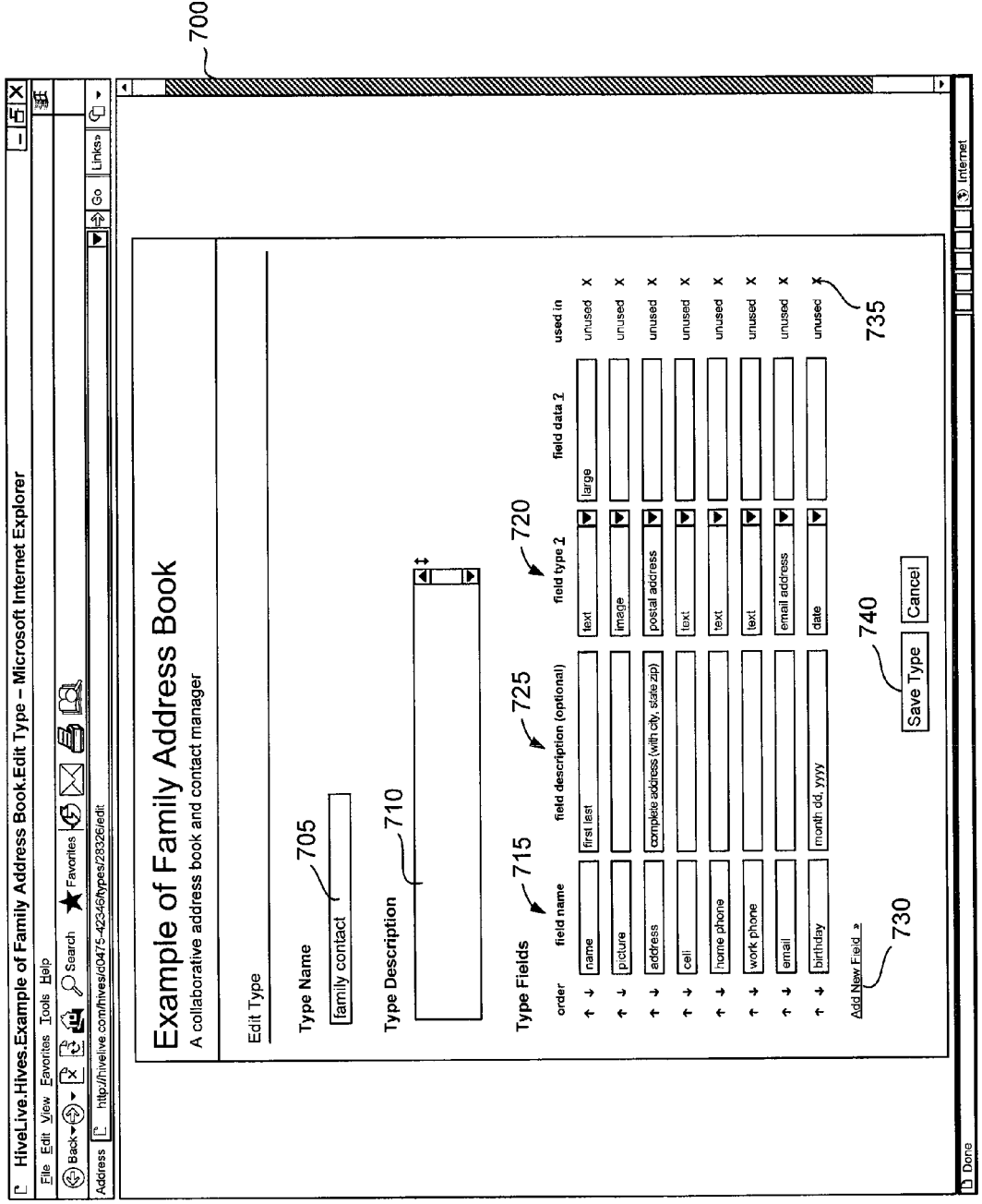
FIGS. 7A and 7B are mock screenshots of a user interface for specifying a name and defining and configuring form fields of a member-configurable data entry form in accordance with an illustrative embodiment of the invention.
Figure 7B:
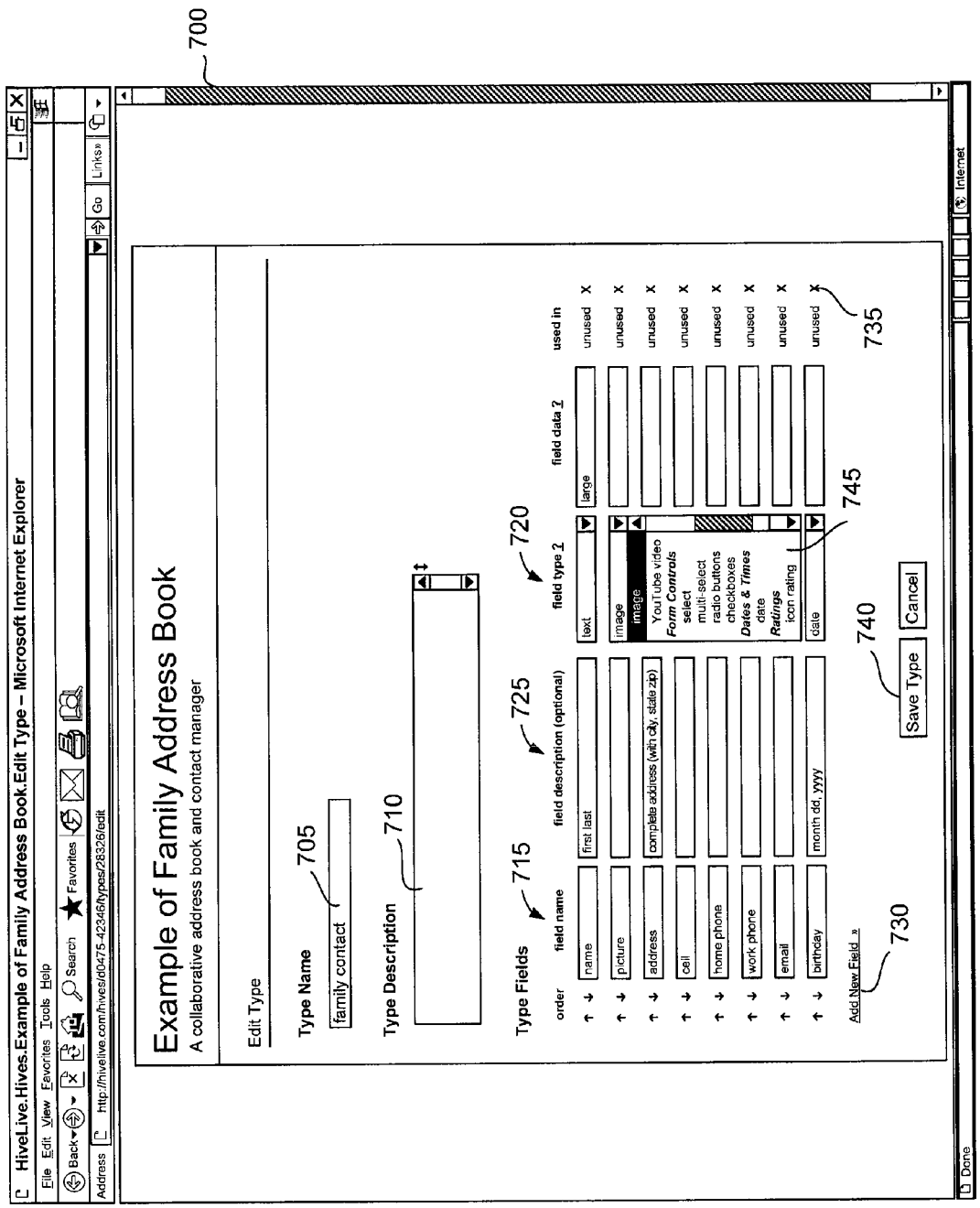

FIGS. 7A and 7B are mock screenshots of a user interface for specifying a name and defining and configuring form fields in a member-configurable data entry form 135 in accordance with an illustrative embodiment of the invention. Referring first to FIG. 7A, mock screenshot 700 depicts a Web page that includes a user interface for creating or modifying a member-configurable data entry form 135 (called a "Type" in mock screenshot 700) for a family-address-book archive 130. This family address book is an example of a restricted-group archive 425 in FIG. 4.

A member may enter a name for the member-configurable data entry form 135 in name field 705. In this example, the member has chosen the name "family contact." The member may enter an optional description in description field 710. A name for each field may be entered into field-name field 715. The member may select a field type for each field by setting the field-type attribute 720. An optional field description may be entered in the field-description field 725. The member may add additional fields by clicking on the "Add New Field" hyperlink 730. Similarly, the member may delete a field by clicking on the "X" icon 735 at the end of the applicable row of the form. Once the member is satisfied with the design of the member-configurable data entry form 135, he or she may click on the "Save Type" button 740.

In FIG. 7B, a dropdown list 745 is shown to illustrate that a member may select from a large number of different predefined field types in configuring a particular field of a member-configurable data entry form 135. For example, the member has configured the "picture" field in FIG. 7B to be of type "image" so that information management system 100 will expect an image to be posted to that field when a new information item 305 is posted to the family-address-book archive 130.

Figure 8:
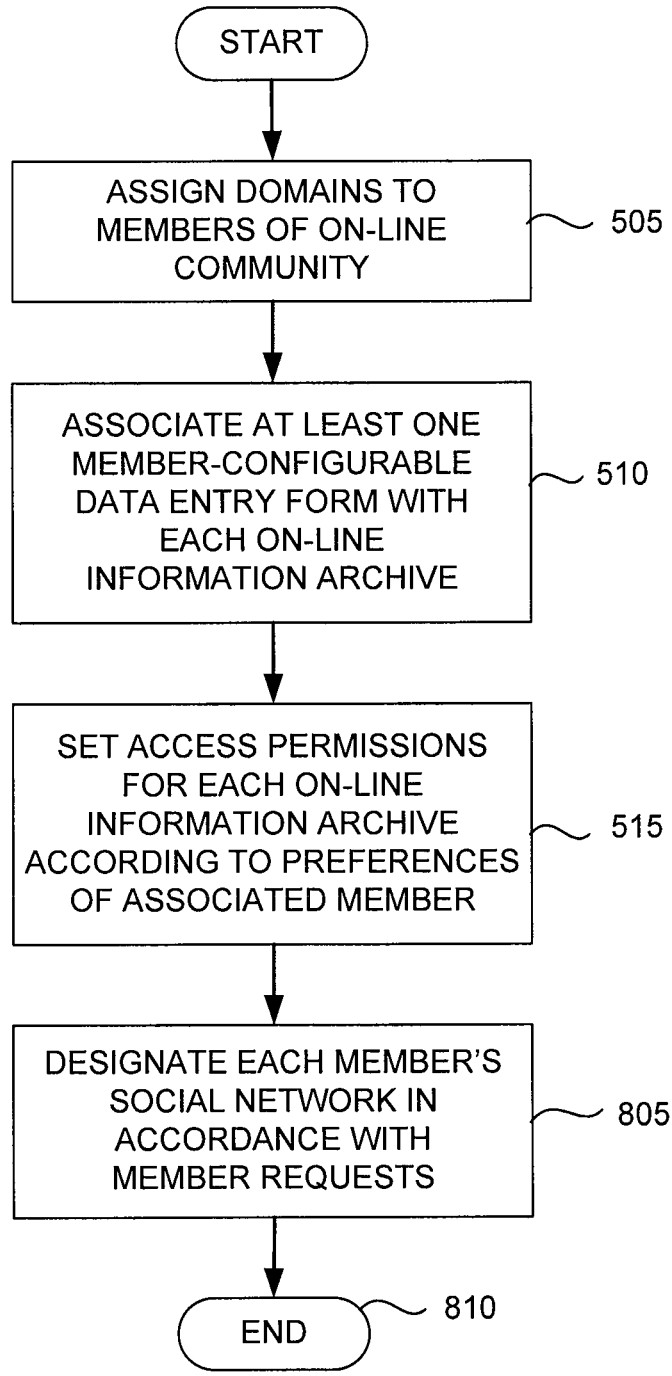
FIG. 8 is a flowchart of a method for managing information in an on-line community in accordance with another illustrative embodiment of the invention.

FIG. 8 is a flowchart of a method for managing information in an on-line community in accordance with another illustrative embodiment of the invention. In FIG. 8, the process proceeds as in FIG. 5 through Block 515. At 805, member-relationships module 160 designates each member's social network in accordance with that member's requests. A member, in accordance with this illustrative embodiment, may invite others to join the on-line community based on, for example, e-mail address and may designate one or more other members as "friends" or "buddies" with whom that member desires to share information. These other members become that member's social network 140. Information management system 100 may be used to provide up-to-date status information and recent posts of those in a given member's social network 140. At 810, the process terminates.

Figure 9:
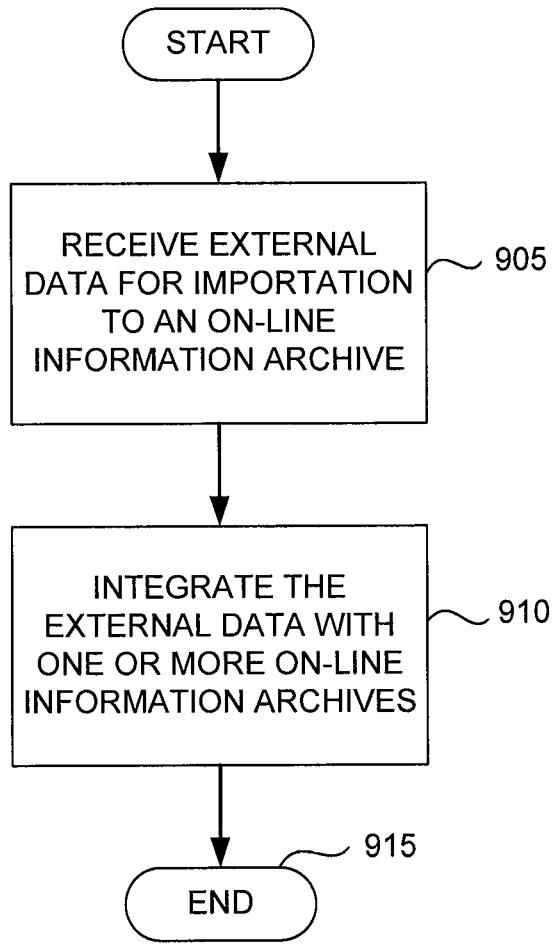
FIG. 9 is a flowchart of a method for importing external data to an on-line information archive in accordance with an illustrative embodiment of the invention.

FIG. 9 is a flowchart of a method for importing external data to an archive 130 in accordance with an illustrative embodiment of the invention. In some cases, a member may have a large amount of data that he or she wishes to import to an archive 130 in information management system 100. For example, a member may have contacts in a program such as MICROSOFT OUTLOOK that he or she wishes to transfer to a family-address-book archive 130. Data-importation module 165 (see FIG. 1) facilitates such a data transfer, relieving the member of the task of manually typing in the information via a member-configurable data entry form 135. In some embodiments, data-importation module 165 includes a data-importation application program interface (API). This data-importation (API) permits any authorized computer, including a client or server associated with a third-party person or entity who is not a member of the on-line community, to submit external data for integration with one or more specified archives 130. This permits a third-party software developer to write a script that, for example, automatically imports contacts from an application such as OUTLOOK.

At 905, data-importation module 165 receives external data from a submitting computer. For example, a member may export the data to a standard file on his or her client computer 110 and then upload the file to information management system 100. Alternatively, a client-side script may be executed on the member's client computer 110 that automatically extracts the needed data from a designated application such as OUTLOOK. At 910, data-importation module 165 integrates the external data with one or more selected archives 130. In doing so, data-importation module 165 may consult a member-configurable data entry form 135 associated with each archive 130 to match up fields automatically to properly format the resulting information items 305 that are added to that archive 130. At 915, the process terminates.

Figure 10:
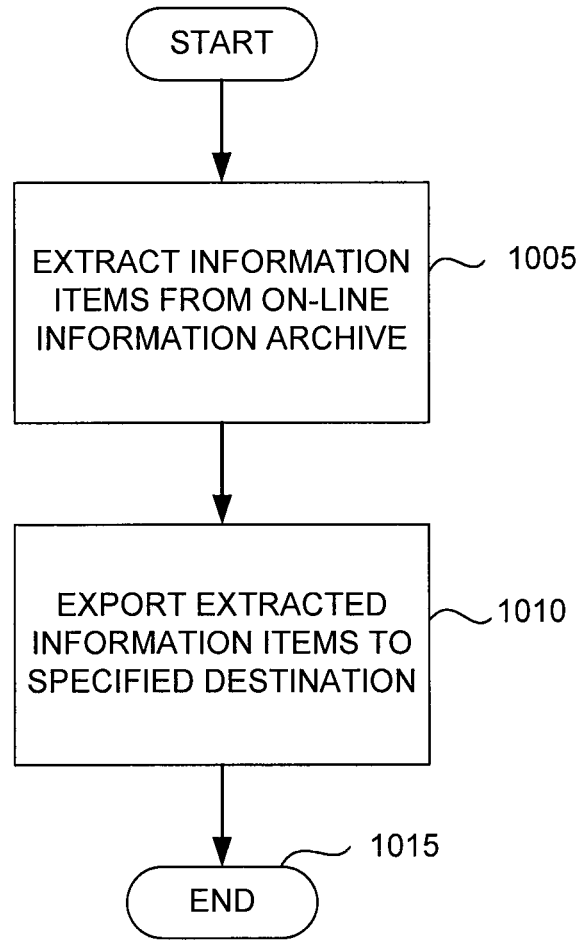
FIG. 10 is a flowchart of a method for exporting information items from an on-line information archive in accordance with an illustrative embodiment of the invention.

FIG. 10 is a flowchart of a method for exporting information items 305 from an archive 130 in accordance with an illustrative embodiment of the invention. FIG. 10 addresses the opposite problem of that discussed in connection with FIG. 9, that of exporting data from an archive 130 to a destination specified by a requesting computer (e.g., a server or a client application). In some embodiments, data exportation module 170 includes a data-exportation API that permits any authorized requesting computer, including a client or server associated with a third-party person or entity who is not a member of the on-line community, to extract information items 305 from archives 130. This permits a third-party software developer to write a script that, for example, automatically extracts and displays information from information management system 100 via an application separate from information management system 100 and even outside a standard Web browser.

At 1005, data-exportation module 170 extracts information items 305 from a selected archive 130 in response to a request from a requesting computer. At 1010, data-exportation module exports the extracted information items 305 to a destination specified by the requesting computer. In some applications, the destination is simply the requesting computer itself, whether client or server. In other applications, the specified destination is another location on the network. For example, the extracted information items can be exported to a member's Web browser or to another application on a client computer 110. At 1015, the process terminates.

Figure 11:
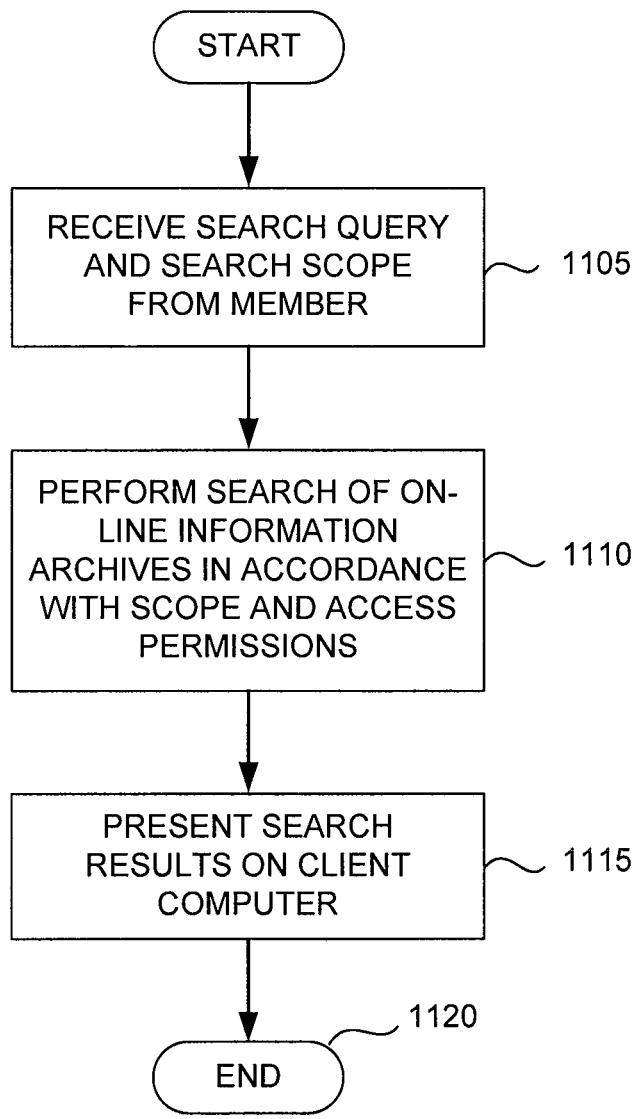
FIG. 11 is a flowchart of a method for searching one or more on-line information archives in accordance with an illustrative embodiment of the invention.

FIG. 11 is a flowchart of a method for searching one or more archives 130 in accordance with an illustrative embodiment of the invention. Once information is stored in information management system 100, members want to be able to retrieve it easily and efficiently, whether it resides in their own archives 130 or in those of other members whose archives 130 they have permission to view. At 1105, search module 175 receives a search query from a member in the context of a particular search scope such as a particular archive 130, all archives 130 that are associated with the searching member, all archives 130 associated with members in the searching member's social network 140, or all archives 130 in the entire on-line community. At 1110, search module 175 performs a search of archives 130 within the indicated scope and applicable access permissions. At 1115, search module 175 presents the results of the search on the searching members' client computer 110. At 1120, the process terminates.

Figure 12:
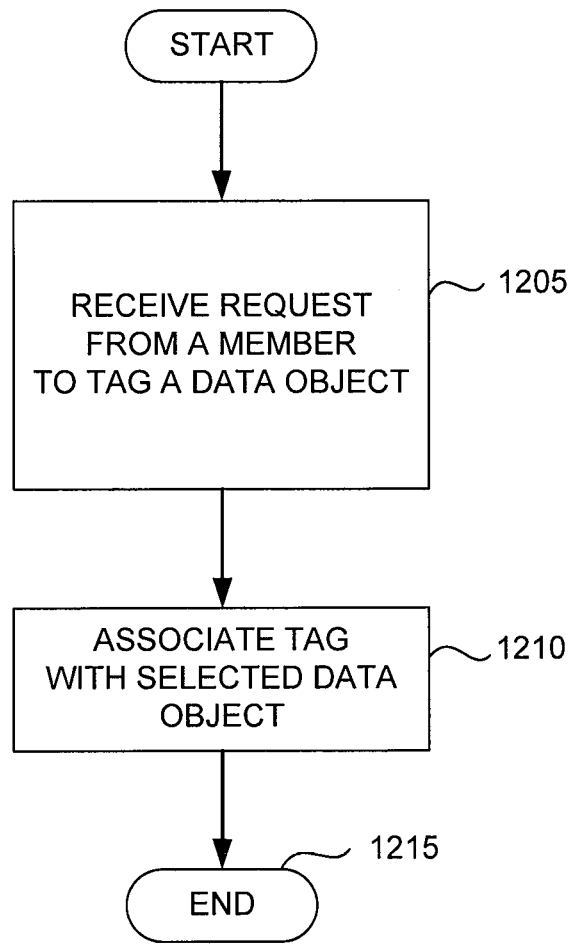
FIG. 12 is a flowchart of a method for tagging information items in on-line information archives in accordance with an illustrative embodiment of the invention.

FIG. 12 is a flowchart of a method for tagging data objects in information management system 100 in accordance with an illustrative embodiment of the invention. Herein, a "data object" is any distinct, identifiable unit of data that is managed and manipulated by information management system 100, including data structures associated with members or groups of members sharing a domain. Data objects include, without limitation, domains 125 assigned jointly to multiple members ("groups"), domains 125 assigned to individual members, archives 130, information items 305, and comments 310. To facilitate searching by search module 175 or otherwise organizing and tracking data objects, specific data objects may be electronically tagged. For example, a member may desire to tag various members and groups, archives 130, information items 305 in one or more archives 130, and comments 310 on information items 305 as being related to a certain topic that is of interest to that member. Examples of such topics include, without limitation, projects, hobbies, employers, customers, geographic regions, vacations, and research topics. At 1205, tag-management module 180 receives a request from a member to tag a specific information item 305 in an archive 130 associated with that member. At 1210, tag-management module 180 associates the tag with the selected information item 305. At 1215, the process terminates.

In one illustrative embodiment, members are permitted to tag any data objects they have permission to view.

Figure 13:
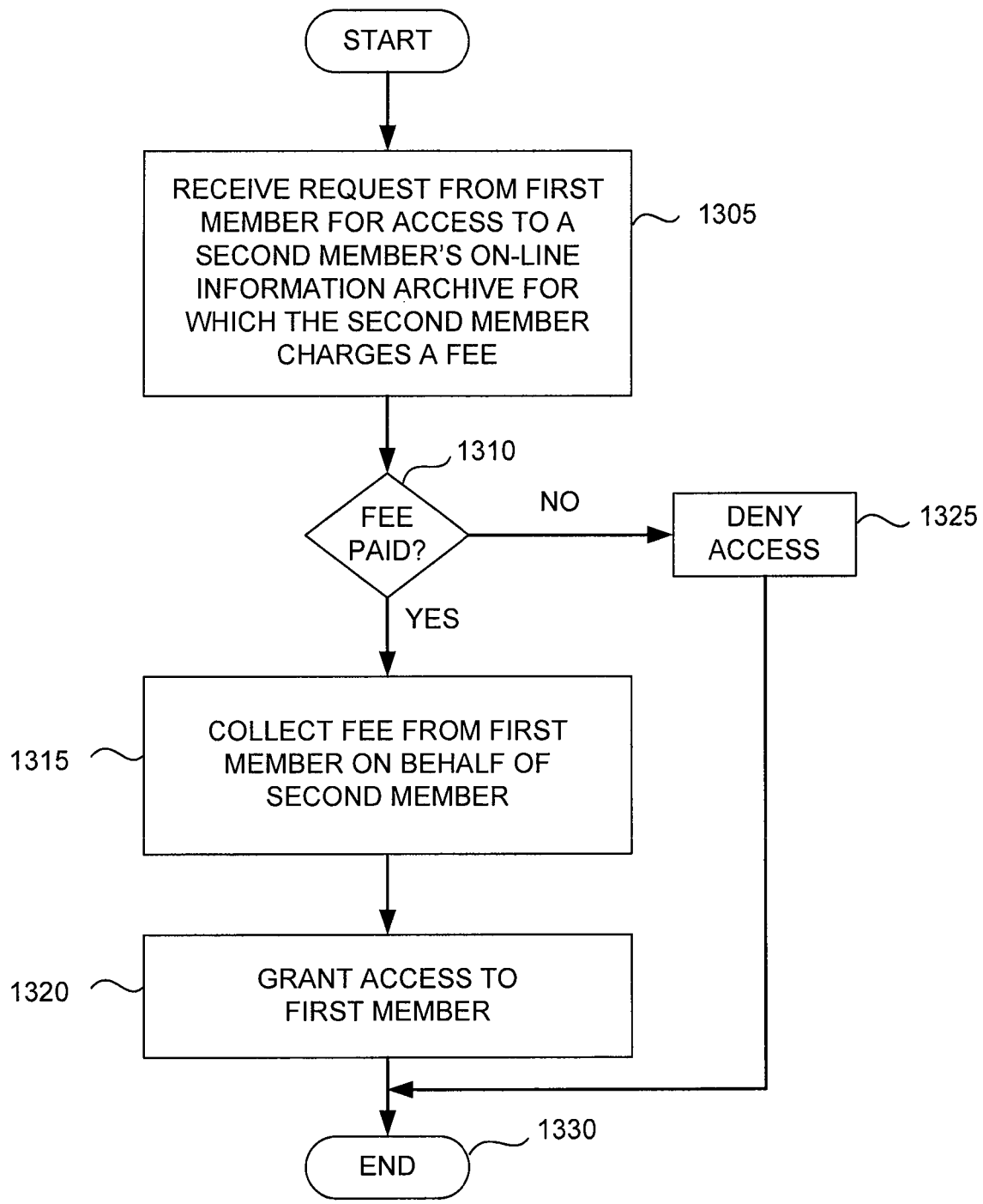
FIG. 13 is a flowchart of a method for collecting a fee from a first member of an on-line community on behalf of a second member of the on-line community as a condition on granting the first member access to an on-line information archive associated with the second member in accordance with an illustrative embodiment of the invention.

FIG. 13 is a flowchart of a method for collecting a fee from a first member on behalf of a second member as a condition on granting the first member access to an archive 130 associated with the second member in accordance with an illustrative embodiment of the invention. At 1305, information management system 100 receives a request from a first member for access to a second member's archive 130 for which the second member charges a fee. If the first member agrees to pay the fee at 1310, information management system 100 collects the fee from the first member on behalf of the second member at 1315. In some embodiments, the operator of information management system 100 receives a portion of the collected fee. In other embodiments, the entire fee is passed along to the second member. At 1320, information management system 100 grants the first member access to the archive 130. If the first member declines to pay the requested fee at 1310, information management system 100 denies access to the archive 130 at 1325. At 1330, the process terminates.

In implementing such a fee-for-access system, those skilled in the art will recognize that technology such as secure sockets layer (SSL) may be employed to protect sensitive information such as a member's credit card.

Figure 14:
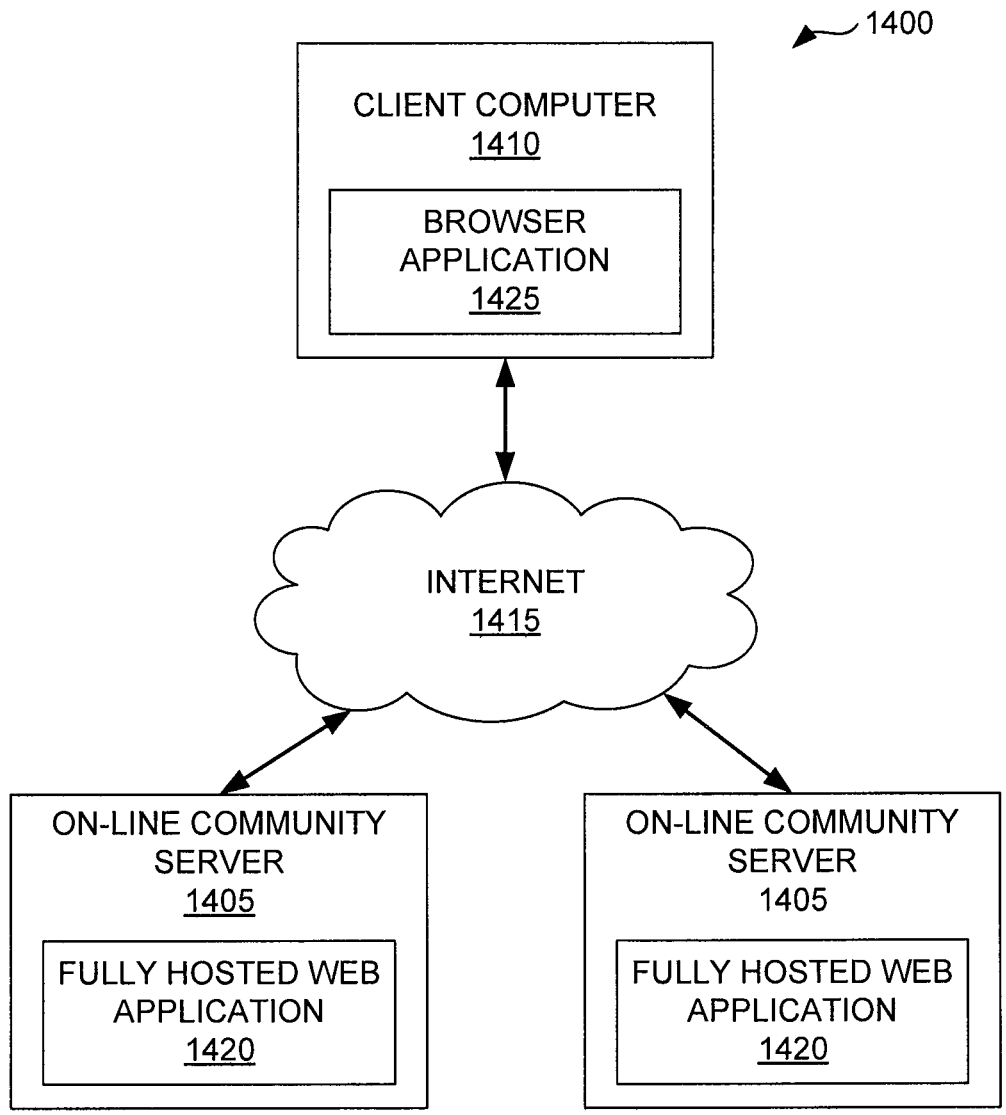
FIG. 14 is a flowchart of a client-server implementation of an information management system for managing information in an on-line community in accordance with an illustrative embodiment of the invention.

FIG. 14 is a flowchart of a client-server implementation 1400 of an information management system 100 for managing information in an on-line community in accordance with an illustrative embodiment of the invention. In FIG. 14, two separate on-line community servers 1405 associated with two separate on-line communities are capable of communicating with client computer 1410 via the Internet 1415. In one embodiment, on-line community servers 1405 and client computer 1410 communicate over the portion of the Internet 1415 known as the World Wide Web. Client computer 1410 is associated with an arbitrary member of either or both on-line communities associated with the respective on-line community servers 1405.

Each on-line community server 1405 includes a fully hosted Web application 1420 that implements the functionality of information management system 100 and interfaces that on-line community server 1405 with a browser application 1425 running on client computer 1410. On-line community servers 1405 are each partitioned into a plurality of domains, each domain corresponding to a member of the on-line community served by that on-line community server 1405.

Those skilled in the art will recognize that fully hosted Web application 1420 may be implemented using, for example, a server-side scripting language such as Hypertext Preprocessor (PHP). Member-configurable data entry forms 135 can be implemented using, for example, JAVASCRIPT and the Document Object Model (DOM) of the browser application 1425 on client computer 1410.

FIG. 14 also illustrates that separate on-line communities with separate information management systems 100 embodied in separate on-line community servers 1405 can, in some embodiments, be configured to communicate with each other with appropriate access controls and permissions, as described above in connection with FIG. 4. For example, each of two private entities such as a research lab and a university may have its own private on-line community managed by an information management system 100 that is restricted to those who belong to that entity. In one embodiment, the information management systems 100 embodied in the respective private on-line community servers 1405 may be configured to communicate with each other to facilitate collaboration between the two user communities.

In conclusion, the present invention provides, among other things, a method and system for managing information in an on-line community. Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention as expressed in the claims.

What is claimed is:

1. A method for managing information in an on-line community of a plurality of members, the method comprising:

assigning, in an information management system to each member of the on-line community, a distinct domain within the on-line community, each distinct domain hosting at least one on-line information archive associated with the member assigned to that distinct domain;

associating with each on-line information archive a plurality of different dynamic member-configurable data entry forms, each member-configurable data entry form associated with a given on-line information archive associated with the member and comprising a reusable template defining a format and content of a different, specific type of information item that may be posted to that on-line information archive by the member associated with the given on-line information archive, each reusable template including a name and at least one form field, the name being specifiable by the member of the on-line community associated with the given on-line information archive, a number of the the at least one form field being selected by the member of the on-line community associated with the given on-line information archive and each form field definable and configurable by the member of the on-line community associated with the given on-line information archive and independent of other members of the plurality of members of the on-line community; and setting access permissions for each on-line information archive in accordance with preferences of the member associated with that on-line information archive, the access permissions specifying which members of the on-line community are permitted to access that on-line information archive and to what extent each of those members is permitted to access that on-line information archive.

2. The method of claim 1, further comprising:

searching at least one on-line information archive in the information management system in response to a search query from a particular member of the on-line community; and returning search results to the particular member.

3. The method of claim 1, wherein the at least one form field included in a given member-configurable data entry form is configurable through the selection of a field type from a set of predetermined field types.

4. The method of claim 1, further comprising:

creating a new on-line information archive in response to a request from a member of the on-line community.

5. The method of claim 1, further comprising:
creating a new member-configurable data entry form in response to a request from a member of the on-line community.

6. The method of claim 1, further comprising:
collecting a fee from a first member of the on-line community on behalf of a second member of the on-line community as a condition on granting the first member access to an on-line information archive associated with the second member.

7. The method of claim 1, wherein each form field is configured and defined with a name and a type of data for the form field, the type of data for the form field comprising one of a note, a blog, a collaborative Web document, a contact, a recipe, a review, an image, an audio file, a video file, an electronic drop box, an e-mail message, a Webzine, and a newsletter.

8. The method of claim 1, wherein the at least one field of at least one of the reusable templates comprises a plurality of fields.

9. The method of claim 8, wherein the plurality of fields comprise two or more different types of data.

10. The method of claim 9, wherein at least one of the plurality of fields comprises content editable by a member of the on-line community other than the member associated with the given on-line information archive.

11. A system comprising:
a processor; and
a memory coupled with and readable by the processor and storing therein a set of instructions which, when executed by the processor, causes the processor to manage information in an on-line community of a plurality of members by:
assigning to each member of the on-line community, a distinct domain within the on-line community, each distinct domain hosting at least one on-line information archive associated with the member assigned to that distinct domain;
associating with each on-line information archive a plurality of different dynamic member-configurable data entry forms, each member-configurable data entry form associated with a given on-line information archive associated with the member and comprising a reusable template defining a format and content of a different, specific type of information item that may be posted to that on-line information archive by the member associated with the given on-line information archive, each reusable template including a name and at least one form field, the name being specifiable by the member of the on-line community associated with the given on-line information archive, a number of the the at least one form field being selected by the member of the on-line community associated with the given on-line information archive and each form field definable and configurable by the member of the on-line community associated with the given on-line information archive and independent of other members of the plurality of members of the on-line community; and
setting access permissions for each on-line information archive in accordance with preferences of the member associated with that on-line information archive, the access permissions specifying which members of the on-line community are permitted to access that on-line information archive and to what extent each of those members is permitted to access that on-line information archive.

12. The system of claim 11, further comprising:
searching at least one on-line information archive in response to a search query from a particular member of the on-line community; and
returning search results to the particular member.

13. The system of claim 11, wherein the at least one form field included in a given member-configurable data entry form is configurable through the selection of a field type from a set of predetermined field types.

14. The system of claim 11, further comprising:
creating a new on-line information archive in response to a request from a member of the on-line community.

15. The system of claim 11, further comprising:
creating a new member-configurable data entry form in response to a request from a member of the on-line community.

16. The system of claim 11, further comprising:
collecting a fee from a first member of the on-line community on behalf of a second member of the on-line community as a condition on granting the first member access to an on-line information archive associated with the second member.

17. The system of claim 11, wherein each form field is configured and defined with a name and a type of data for the form field, the type of data for the form field comprising one of a note, a blog, a collaborative Web document, a contact, a recipe, a review, an image, an audio file, a video file, an electronic drop box, an e-mail message, a Webzine, and a newsletter.

18. A computer-readable non-transitory memory comprising a set of instructions stored therein which, when executed by a processor, causes the processor to manage information in an on-line community of a plurality of members by:
assigning to each member of the on-line community, a distinct domain within the on-line community, each distinct domain hosting at least one on-line information archive associated with the member assigned to that distinct domain; associating with each on-line information archive a plurality of different dynamic member-configurable data entry forms, each member-configurable data entry form associated with a given on-line information archive associated with the member and comprising a reusable template defining a format and content of a different, specific type of information item that may be posted to that on-line information archive by the member associated with the given on-line information archive, each reusable template including a name and at least one form field, the name being specifiable by the member of the on-line community associated with the given on-line information archive, a number of the at least one form field being selected by the member of the on-line community associated with the given on-line information archive and each form field definable and configurable by the member of the on-line community associated with the given on-line information archive and independent of other members of the plurality of members of the on-line community; and
setting access permissions for each on-line information archive in accordance with preferences of the member associated with that on-line information archive, the access permissions specifying which members of the on-line community are permitted to access that on-line information archive and to what extent each of those members is permitted to access that on-line information archive.

19. The computer-readable non-transitory memory of claim 18, further comprising:

searching at least one on-line information archive in response to a search query from a particular member of the on-line community; and returning search results to the particular member.

20. The computer-readable non-transitory memory of claim 18, wherein the at least one form field included in a given member-configurable data entry form is configurable through the selection of a field type from a set of predetermined field types.

21. The computer-readable non-transitory memory of claim 18, further comprising: creating a new on-line information archive in response to a request from a member of the on-line community.

22. The computer-readable non-transitory memory of claim 18, further comprising: creating a new member-configurable data entry form in response to a request from a member of the on-line community.

23. The computer-readable non-transitory memory of claim 18, further comprising: collecting a fee from a first member of the on-line community on behalf of a second member of the on-line community as a condition on granting the first member access to an on-line information archive associated with the second member.

24. The computer-readable non-transitory memory of claim 18, wherein each form field is configured and defined with a name and a type of data for the form field, the type of data for the form field comprising one of a note, a blog, a collaborative Web document, a contact, a recipe, a review, an image, an audio file, a video file, an electronic drop box, an e-mail message, a Webzine, and a newsletter.

\* \* \* \* \*